United States Patent
Chandler et al.

[11] 3,893,404
[45] July 8, 1975

[54] PULL-AHEAD WINCH CONTROL SYSTEM

[75] Inventors: William R. Chandler, Sedro-Woolley, Wash.; Donald R. Cooper, North Hollywood, Calif.; Edward J. Mangold, Burlington, Wash.

[73] Assignee: Skagit Corporation, Sedro-Woolley, Wash.

[22] Filed: Mar. 25, 1974

[21] Appl. No.: 454,506

[52] U.S. Cl.............. 115/7; 114/144 B; 61/72.4; 318/6 R
[51] Int. Cl............................................. B63h 15/00
[58] Field of Search......... 254/172, 150; 114/144 R, 114/144 B; 318/6 R; 61/72 R, 72.1, 72.3, 72.4, 72.5, 72.6; 37/62, 63; 115/7

[56] References Cited
UNITED STATES PATENTS

| | | | |
|---|---|---|---|
| 2,755,632 | 7/1956 | Hauber et al. | 61/72.4 |
| 3,422,783 | 1/1969 | Moulin | 114/144 B |
| 3,448,357 | 6/1969 | Dolphin | 318/6 |
| 3,508,512 | 4/1970 | Desrayand et al. | 114/144 B |
| 3,693,939 | 9/1972 | Buckson | 254/172 |
| 3,715,890 | 2/1973 | Langner | 61/72.3 |
| 3,786,642 | 1/1974 | Good et al. | 61/72.4 |

Primary Examiner—Robert J. Spar
Assistant Examiner—Kenneth Noland
Attorney, Agent, or Firm—Robert C. Smith; William F. Thornton

[57] ABSTRACT

A control system is provided for a pull-ahead winch used on a barge which digs a trench on the floor of a body of water and lays pipe in the trench. The trenching device or jet sled is suspended from the barge and is supplied with air and water at considerable force which are used to displace the bottom soil to dig the trench. The jet sled is pulled along a desired path by means of a cable, usually of fixed length, extending from a winch on the barge, and forward movement is supplied by one or more pull-ahead winches which reel in on a forwardly extending cable at a desired rate to permit the trench to be of the desired depth. Sled cable tension is controlled to a desired value by sensing this tension and producing an electrical signal proportional thereto, modifying this signal in a signal-shaping circuit comprising a second order lead-lag filter and comparing the modified signal with a tension reference signal to produce an error signal. The error signal is further modified by a signal representative of velocity and direction of movement of the pull-ahead cable. This modified error signal is then amplified and supplied to an electrically controlled clutch which controls the drive to the pull-ahead winch.

9 Claims, 5 Drawing Figures

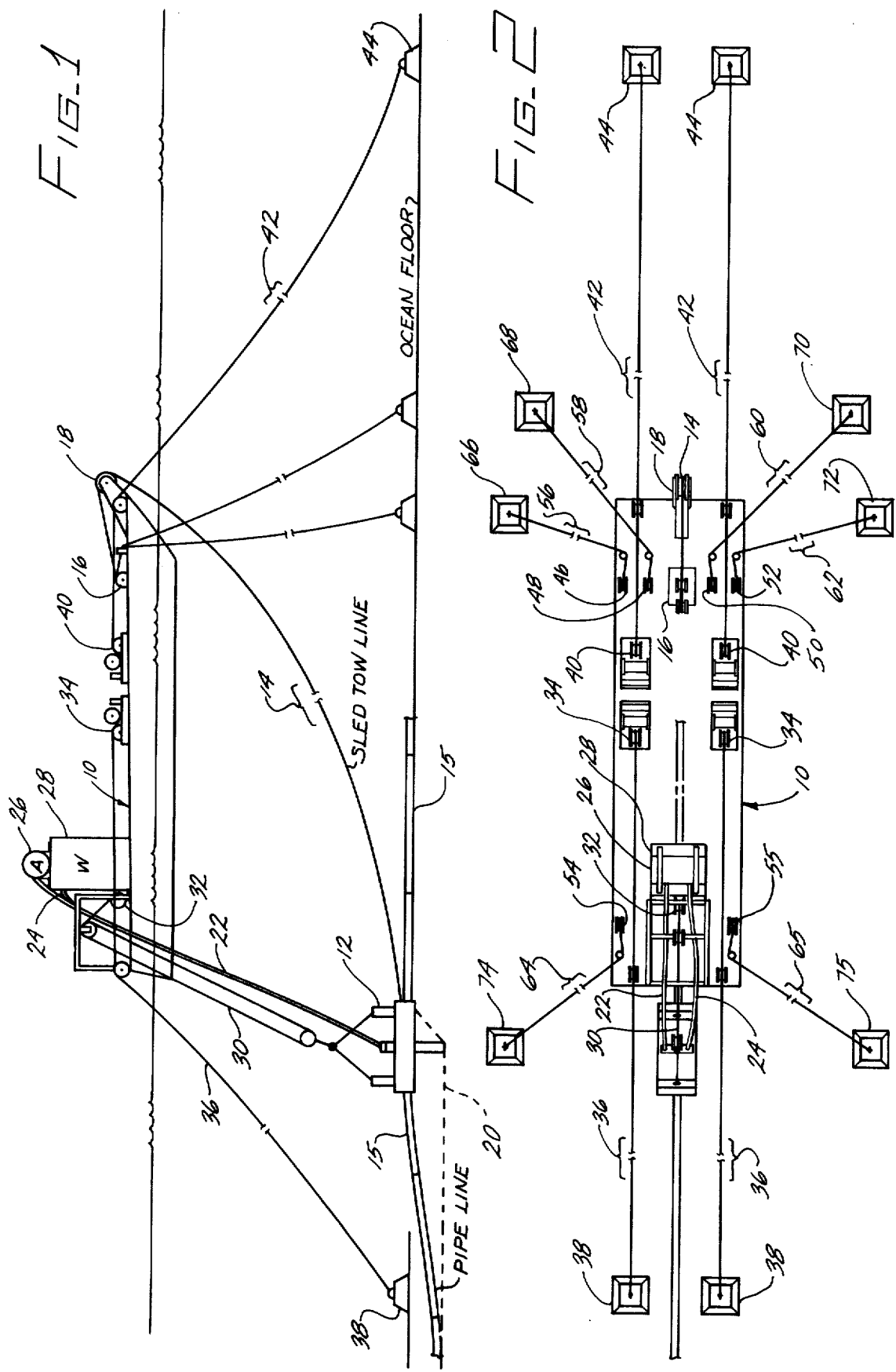

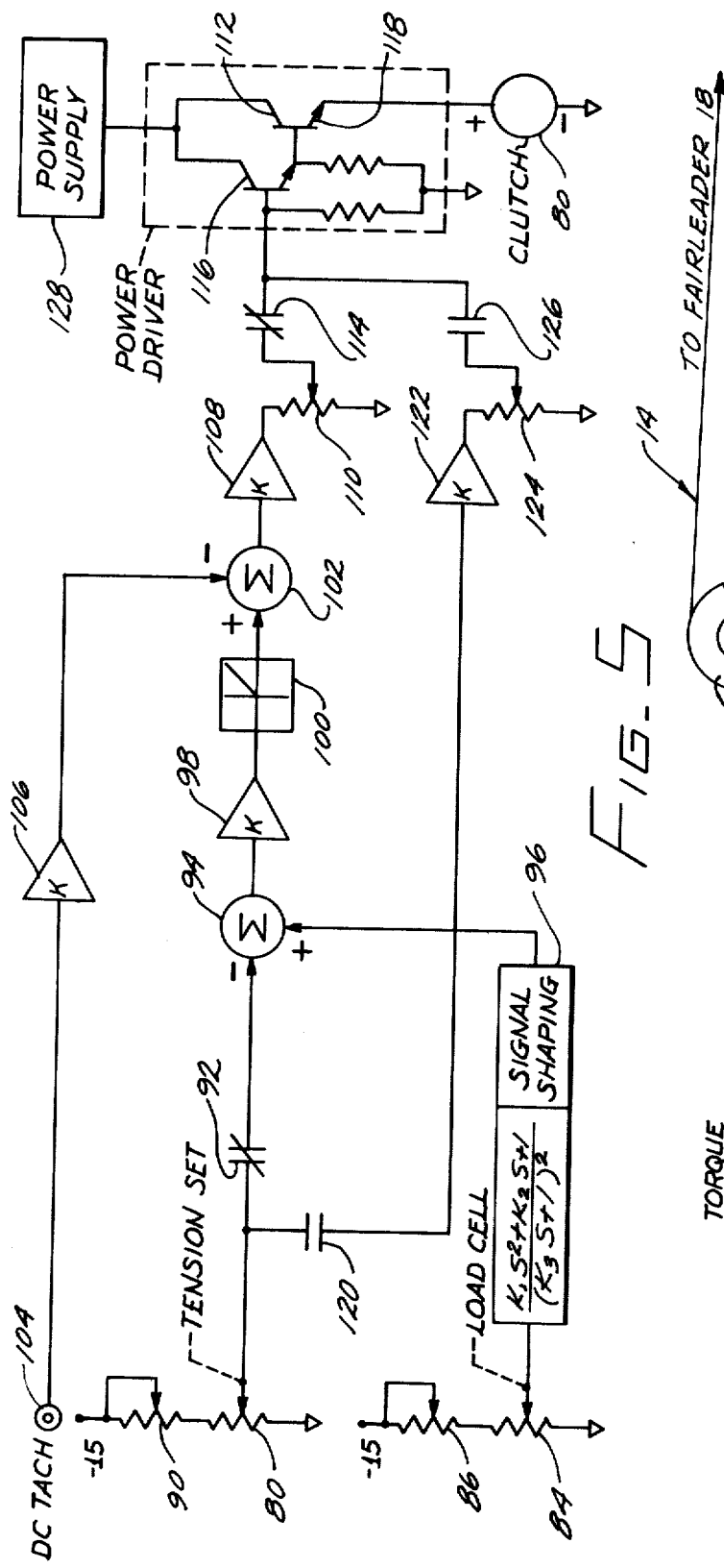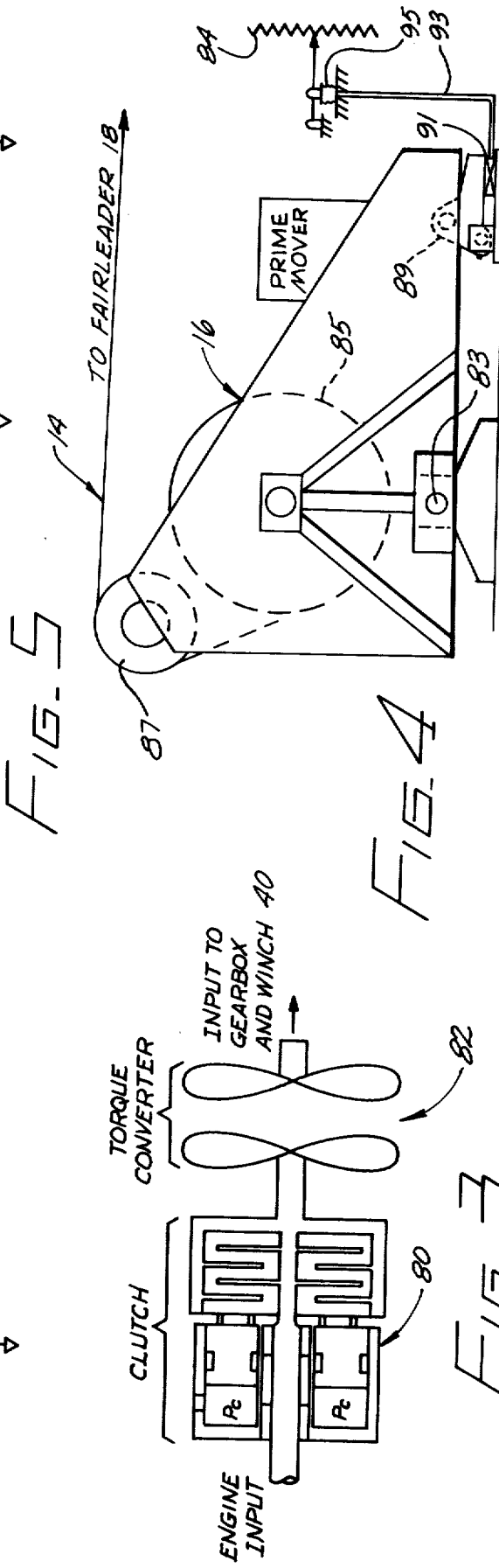
FIG. 5
FIG. 4
FIG. 3

PULL-AHEAD WINCH CONTROL SYSTEM

BACKGROUND OF THE INVENTION

The use of barges for laying pipe in the floor of large bodies of water, or along or across rivers, is not new. The barge is arranged to pull a trenching implement or "sled" along the floor in such manner as to make a trench as straight as possible and with a reasonably uniform depth, and a continuous length of pipe is laid in the trench. A typical trenching implement forces air and water into the bottom with great force to dislodge soil and displace it from the desired trench location. In order to form the desired trench, it becomes necessary to control the position of the barge with some precision. If the barge is permitted to drift with current conditions or to be erratic in its course, the trench may be crooked or may be directed in the wrong direction. If the speed of the barge is inconsistent, the sled may dig the trench shallower or deeper than desired. Divers are used to make periodic inspections of the trench being dug, and these inspections are made under difficult visual conditions because of the amount of soil and debris which is present at and near the trenching operation.

To maintain the barge in the proper position and to move it along the desired line, a number of anchors are located at the sides of the barge and are connected to winches to restrain the barge from drifting toward the sides. Similar anchors and winches are connected to the stern. One or more forwardly directed cable and anchor assemblies are controlled by winches which wind the cable in to produce forward movement of the barge. If the pull-ahead winch pulls in too strongly, the barge may move too fast, resulting in a shallow trench, or if the sled is blocked by an obstacle the sled cable may be damaged or break. Breaking of the sled cable may also result in breaking air and water lines to the sled. If the obstacle is an existing pipeline, the sled may break the existing pipeline, with substantial damage resulting. Previous practice has required the services of an operator to visually observe the cable tension as reflected in a tension read-out instrument, and to react to tensions departing from the desired range by manually controlling the pull-ahead winch. This is unsatisfactory because such monitoring is tedious and subject to human error. Such manual control inevitably has led to some variation in the sled operation, requiring more frequent monitoring by divers. Each dive is expensive, and it is desirable, therefore, to minimize this expense.

From the foregoing it will be apparent that relying on visual monitoring by an operator, while it can be done, may result in greater down time because of errors resulting from operator fatigue. Greater diver time is required to monitor operation of the sled. And the results of such errors may be quite serious in terms of damage to the trenching equipment, the equipment of others, and possibly to the environment.

SUMMARY OF THE INVENTION

Many of the problems referred to above can be eliminated or alleviated by providing a system capable of controlling sled cable tension automatically within certain limits and which will respond to sensed cable tensions substantially out of a desired range by taking corrective action to avoid damage to the cable, the sled, or a submerged object such as an existing pipeline. This involves difficulties because the sled cable length, once established, is not usually changed, and yet it is this tension which must be controlled through control of the pullahead winch. Before tension can be generated in the pull-ahead cable, it must be stretched, and likewise before tension can be generated in the sled cable, the barge which has great inertia must be moved somewhat to stretch the sled cable. Thus, there will be a large lag between the application of the control signal to the pull-ahead winch and the resultant tension in the sled cable. An analysis of the dynamic characteristics of the system made it apparent that a direct summation of cable tension and tension feedback would result in a system which is inherently unstable. Applicants' automatic system includes a second-order lead-lag signal shaper which modifies the cable tension feedback signal to enhance the stability of the system and which responds to cable tensions out of the desired range by releasing tension on the sled cable.

DESCRIPTION OF THE DRAWINGS

FIG. 1 is a side view of a typical pipe-laying barge showing side, forward and rearwardly directed anchor lines and the trenching sled pulled by the barge.

FIG. 2 is a top view of the barge of FIG. 1.

FIG. 3 is a schematic drawing of the mechanical drive structure for the pull-ahead winches used on the barge of FIGS. 1 and 2.

FIG. 4 is a schematic diagram of the winch and load cell arrangment used to provide the tension signal for the sled cable.

FIG. 5 is a block diagram of the electrical control system used to control the tension on the sled cable.

DESCRIPTION OF THE PREFERRED EMBODIMENT

Referring now to FIG. 1, a barge 10 is shown floating on a body of water which may be an ocean. The barge 10 is connected to a trenching device 12, which in this case is a jet sled, by means of a tow line 14 reeled from a winch 16 and across a fairleader 18. The jet sled 12 functions to dig a ditch 20 of the desired depth and width for laying a pipeline 15, as shown. The trenching device is connected through air and water cables 22, 24 to an air tank 26 and a water supply tank 28. Both air tank 26 and water tank 28 include pumping means for delivering the air and water to the sled 12 under high pressure such that air and water are forced into the floor of the body of water at great force, thereby creating a displacement of bottom soil to produce the desired trench. The sled 12 is physically suspended from the rear of the barge 10 by means of cables 30 which may be reeled in and out by means of a winch 32. A pair of winches 34 control stern lines 36, which are attached to anchors 38. Similarly, a pair of pull-ahead winches 40 connect a pair of forwardly directed cables 42 to anchors 44.

FIG. 2 is a top view of the barge and anchor structure shown in FIG. 1. In this view, many of the same members discussed above are visible and are shown with the same numerals. In addition, a plurality of breasting winches 46, 48, 50, 52, 54 and 55 are shown connected to corresponding cables 56, 58, 60, 62, 64 and 65. Each of these laterally directed cables is attached to an anchor such that line 56 is connected to anchor 66, line 58 to anchor 68, line 60 to anchor 70, line 62 to anchor 72, line 64 to anchor 74, and line 65 to anchor 75. The laterally directed breasting winches, cables and anchors serve to hold the barge 10 from drifting laterally as it is moved forward during the course of towing the sled 12 and digging the trench 20. Similarly, the stern-directed cables 36 and anchors 38 aid in holding the barge in alignment so that the tendency of the rear part of the barge to move laterally as it is pulled in a forward direction is effectively restrained. Forward movement is effected after the pull-ahead cables 42 and anchors 44 are deployed as shown by winding in on the pull-ahead winches 40. Since the length of tow line 14 is not usually adjusted once the sled 12 is deployed in a desired position, the preferred operation is for the barge 10 to be moved forward smoothly and uniformly through operation of one or the other of the pull-ahead winches 40 until the barge 10 reaches the approximate location of the anchors 44. At the same time, the winches 34 will be paying out line but subject to substantial resistance to hold the rear of barge 10 in alignment. The breasting winches and cables consist of pairs which oppose each other in establishing laterally directed forces preventing lateral movement of the barge 10. These lines and corresponding anchors are moved as required to permit them to have sufficient lateral component to be effective. Similarly, when the barge 10 reaches the end of one leg of travel as established by the practical limit of the distance within which it can approach anchor 44, the anchor 44 is then raised and moved forwardly again by means of a tugboat and the cable 42 again reeled outward for the desired distance, which may be of the order of 5000 feet. As the pull-ahead winch 40 is operated to smoothly wind in the cable 42, this normally produces a uniform tension on line 14 and causes the sled 12 to move forward smoothly and uniformly, thus digging a straight trench for the laying of pipeline 15. The trench is frequently inspected by divers who may inform the pull-ahead winch operators to increase or decrease speed, depending upon whether the trench is too deep or too shallow.

As shown schematically in FIG. 3, each of the winches 40 is driven by a prime mover which may be any suitable engine, such as a Diesel engine, driving through an electrically actuated clutch shown generally at numeral 80 to a torque converter 82. The output of the torque converter 82 is connected through a conventional gear box to drive the winch 40. The output of winch 40 may be controlled through controlling of an electrical signal described below which actuates the clutch 80. In applicants' system, the clutch 80 and the torque converter 82 constitute a commercially available unit manufactured by Twin Disc, Incorporated, 1328 Racine Street, Racine, Wisconsin, and identified as a Type 4 Omega Drive Torque Converter. In this system, an electrical control signal is supplied to a proportional solenoid which converts it into an essentially proportional hydraulic control pressure which, in turn, is combined with a pressure representing a centrifugal force from the driven clutch elements to produce a pressure $P_c$ operating to compress the clutch friction disks together. The function of the clutch used by applicants is as described above, and greater detail is not believed warranted since it is a commercially available unit. From consideration of the structure of FIG. 3, it will be apparent that as the electrical signal varies to increase control pressure $P_c$, the drive to the torque converter increases in proportion, and therefore the input to the gear box and the winch also increases in proportion. Similarly, as the electrical control signal is reduced in voltage, $P_c$ is also reduced, the friction between the clutch plates also is reduced, the primary impeller of the torque converter slows down, and so also will the gear box and winch 40.

FIG. 4 is a schematic drawing of the arrangement of winch 16 and sled cable 14 showing the manner in which the signal representing tension in cable 14 is generated. The frame for winch 16 is partially carried on a pivot structure 83 located below the axis of the winch drum 85. As cable 14 is wound off of drum 85 it passes over a sheave 87 and extends toward fairleader 18 as shown. Another point of support for the frame of winch 16 is at a load cell 89 which is attached to the frame and to the supporting deck such that, as the tension is increased in cable 14, the frame tends to rotate around pivot 83 compressing the hydraulic chamber 91 in the load cell. As chamber 91 is compressed, fluid flows out through a conduit 93 to a fluid pressure-responsive member 95 which may be a bellows. As bellows 95 expands and contracts, it moves the slider of a potentiometer 84, thus producing a direct current voltage proportional to cable tension. Load cell 89 is a commercially available unit manufactured by Martin Decker Co., 1928 South Grand Avenue, Santa Ana, California 92705.

In FIG. 5, potentiometer 84 is shown producing an electrical signal proportional to the sensed tension, and a second potentiometer 86 provides a reference setting means. Each of these potentiometers is connected across a suitable low voltage source, in this case $-15$ volts. Potentiometers 88 and 90 are connected across a similar low voltage source and are arranged to provide a tension reference signal, potentiometer 88 being varied to vary the desired tension value and potentiometer 90 setting a threshold or range value. The tension reference signal from potentiometer 88 is connected through a normally-closed switch 92 to a summer 94 where it is compared with the signal from the potentiometer 84 as modified by means of a signal-shaping circuit 96. Because of the substantial amount of inertia in the barge, the factors involved in stretching of the cable, cable inertia, etc., it is necessary to modify the load cell signal by means of a signal shaper including a second order lead-lag filter. This filter has a transfer function defined by the following relationship:

$$\frac{K_1 s^2 + K_2 s + 1}{(K_3 s + 1)^2}$$

where $s$ is the Laplace variable.

In applicants' system it was determined that the constants were such that the resulting equation was:

$$\frac{16 s^2 + 1.6 s + 1}{(0.35 s + 1)^2}$$

It will be recognized by those skilled in the art that variations in the above equations will necessarily result from changes in the weight or mass of the barge, changes in cable stretch characteristics, etc.

The resultant of the signals summed at summer 94 is supplied through a gain element or amplifier 98 and a unidirectional flow element 100 to a summer 102. It is the function of element 100 to pass all positive-going signals from gain 98 on a linear 1-to-1 basis and to block all negative-going signals. Also connected to the summer 102 is a signal from a direct current tachometer 104 which is driven by movement of the pull-ahead cable 42 and wherein the voltage output is proportional to the said speed and the polarity is proportional to the direction of movement of the cable. This signal is supplied through a scaler or amplifying device 106 and is combined in opposite polarity is summer 102 with the modified tension error signal. This combined signal is then further modified in a scaler or gain device 108 and is impressed across a potentiometer 110. Potentiometer 110 constitutes a gain device at the input to a power driver amplifier 112 and is connected through a normally closed switch 114 to the base circuit of a transistor 116 whose output is, in turn, further amplified in a transistor 118 before being connected across the clutch 80. As previously indicated, the electrical input to the clutch 80 is actually across the winding of a proportional solenoid.

Bypassing most of the control circuit thus far described is a manual emergency system whereby the tension reference signal from potentiometer 88 is connected through a normally open switch 120 and a gain element 122 such that it is impressed across a potentiometer 124. The slider of potentiometer 124 is connected through a normally open switch 126 to the input to the power driver amplifier 112. With this arrangement the operator visually observes the cable tension on an indicator connected to the output of potentiometer 84 and adjusts the tension setting accordingly to keep cable tension within desired limits.

A power supply 128 is conventional and supplies power to the power driver amplifier 112 which may be a power Darlington device, Unitrode U2T401, or equivalent.

In operation, when signals are sensed different from the reference value, the resulting error signal from summer 94 will be of such value as to provide an input to the power driver amplifier 112 resulting in varying the energization of the clutch 80. If the tension becomes low, the clutch 80 will be energized in such manner as to cause the winch 40 to pull ahead more strongly on the barge. Should the tension sensed be above the desired reference value, the signal is applied which reduces the energization across the clutch winding, resulting in causing the winch 40 to pull less strongly on the cable 42. Should the sensed cable tension drop to a very low value, indicating a possible malfunction in the sled table tension instrumentation, such as sled 12 out of the trench, the system is shut down and no pull-ahead winch drive is provided. In a case where the sled encounters an obstacle and cable tension becomes very high, the resulting error signal will cause the cluth tension to be greatly reduced, resulting in no effective pull-ahead signal.

The input from the d.c. tachometer 104 which senses speed of the pull-ahead cable 42 is relatively small in magnitude in comparison with the modified cable tension error signal normally supplied to summer 102. It provides a damping signal but would be capable of overriding the tension error signal only when said signal is extremely small.

Modifications may be made within the scope of the present invention. As stated above, variations in certain factors such as the weight of the barge and stretch characteristics of the cables can affect the filter transfer function. The specific clutch, torque converter or load cell described are not required, although any others used must be compatible with the control signal provided from FIG. 5.

We claim:

1. For use on a vessel used to pull a device for underwater trenching wherein a cable is attached to said device and a winch is carried on said vessel and drivably attached to said cable:
   a pull-ahead control for said vessel including a second cable and an anchor attached thereto,
   a second winch drivably attached to said second cable,
   a prime mover and drive means connected to said second winch, said drive means including an electrically actuated clutch;
   means producing an electrical signal substantially responsive to the tension in said first named cable,
   signal shaping means modifying said tension signal in response to changes in tension rate and rate of change of tension rate,
   means producing a tension reference signal,
   means comparing said modified electrical tension signal with said tension reference signal to produce an error signal,
   means producing a cable velocity signal whose magnitude is proportional to velocity of said second cable and whose polarity indicates direction of movement of said cable with respect to said vessel,
   means summing said error signal with said cable velocity signal to produce a control signal and
   power amplifier means connecting said control signal to said electrically actuated clutch.

2. A pull-ahead control for a vessel as set forth in claim 1 wherein said signal shaping means includes a second order lead-lag filter.

3. A pull-ahead control for a vessel as set forth in claim 2 wherein the transfer function of said lead-lag filter is defined by $$\frac{K_1 s^2 + K_2 s + 1}{(K_3 s + 1)^2}$$

where s is the Laplace variable.

4. A pull-ahead control for a vessel as set forth in claim 2 wherein the transfer function of said lead-lag filter is defined by $$\frac{16 s^2 + 1.6 s + 1}{(0.35 s + 1)^2}$$

where s is the Laplace variable.

5. For use with a barge in which a trenching jet sled is suspended from the barge and is pulled by means of a sled cable, and the barge is moved by means of an anchored forwardly directed cable and a pull-ahead winch which winds in on said forwardly directed cable to impart forward movement to said barge, said pull-ahead winch being driven by means of a suitable prime mover and an electrically controlled clutch connected between said prime mover and said pull-ahead winch, a method of controlling tension in said sled cable comprising the steps of
   1. sensing the tension in said sled cable and producing a first electrical signal responsive to said tension,
   2. producing a second electrical signal representative of a desired tension, 3. modifying said first electrical signal by means of a second order lead-lag filter,
4. comparing said modified first electrical signal with said second electrical signal to produce an error signal,
5. producing a third electrical signal representative of velocity and direction of movement of said forwardly directed cable,
6. further modifying said error signal by comparing said error signal with said third electrical signal, and
7. amplifying said modified error signal and connecting said amplified, modified error signal to said electrically controlled clutch.

6. A method of controlling tension in a sled cable as set forth in claim 5 wherein said second order lead-lag filter has a transfer function defined by $$\frac{K_1 s^2 + K_2 s + 1}{(K_3 s + 1)^2}$$

where s is the Laplace variable.

7. In a control system for a barge pulling a trenching device wherein a first cable is attached to said trenching device and to a winch on said barge, a pull-ahead winch on said barge, and a second forwardly-directed cable attached to an anchor and to said pull-ahead winch, said pull-ahead winch being driven by means of a prime mover and electrically controlled clutch means connected between said prime mover and said pull-ahead winch, a third cable on said barge attached to an anchor and extending astern of said barge:

means producing a first electrical signal proportional to the tension in said first cable,
means producing a second electrical signal proportional to a desired value of said tension,
means including a second order lead-lag filter for modifying said first electrical signal,
summing means comparing said first and second signals and producing a tension error signal,
means producing a third electrical signal representative of velocity and direction of movement of said second forwardly-directed cable,
second summing means summing said third electrical signal with said tension error signal to provide a modified error signal,
an amplifier for amplifying said modified error signal, and
means connecting said amplified and modified error signal to said electrically controlled clutch means.

8. A control system for a barge as set forth in claim 7 wherein said first named winch is pivotally mounted on said barge such that tension in said first cable tends to produce a moment around said mounting pivot, a hydraulic load cell is located at the base of said winch such that it produces a hydraulic pressure varying with the magnitude of said moment, and means are provided for converting said hydraulic pressure to an electrical signal to produce said first electrical signal.

9. A control system for a barge as set forth in claim 7 wherein the transfer function of said lead-lag filter is defined by $$\frac{K_1 s^2 + K_2 s + 1}{(K_3 s + 1)^2}$$

where $s$ is the Laplace variable.

* * * * *